United States Patent
Ehrlich

(10) Patent No.: US 6,452,489 B1
(45) Date of Patent: Sep. 17, 2002

(54) TRAILER EMERGENCY BRAKE LAMP

(75) Inventor: Rodney P. Ehrlich, Monticello, IN (US)

(73) Assignee: Wabash Technology Corporation, Naperville, IL (US)

( * ) Notice: Subject to any disclaimer, the term of this patent is extended or adjusted under 35 U.S.C. 154(b) by 0 days.

(21) Appl. No.: 09/927,823

(22) Filed: Aug. 10, 2001

Related U.S. Application Data

(60) Provisional application No. 60/224,710, filed on Aug. 11, 2000.

(51) Int. Cl.[7] ............................................... B60Q 1/44
(52) U.S. Cl. ......................... 340/479; 340/453; 340/463
(58) Field of Search .................................. 340/479, 452, 340/471, 453, 450.1, 451, 463; 303/1, 3, 123; 188/1.11

(56) References Cited

U.S. PATENT DOCUMENTS

| | | | |
|---|---|---|---|
| 3,629,815 A | * 12/1971 | Per Hattwig | 340/52 |
| 3,688,255 A | * 8/1972 | Klein et al. | 340/52 |
| 3,955,652 A | * 5/1976 | Nilsson et al. | 188/112 |
| 4,109,968 A | * 8/1978 | Wood | 303/7 |
| 4,222,614 A | * 9/1980 | Spechko | 303/20 |
| 5,263,771 A | * 11/1993 | Smith | 303/91 |
| 5,504,472 A | * 4/1996 | Wilson | 340/479 |
| 5,606,310 A | * 2/1997 | Egger et al. | 340/479 |
| 5,929,532 A | * 7/1999 | Sell | 307/9.1 |

OTHER PUBLICATIONS

Selected pages from Berg Manufacturing & Sales Company's new "Family" of Stop Light Switches brochure, undated.

* cited by examiner

*Primary Examiner*—Daniel J. Wu
*Assistant Examiner*—Son Tang
(74) *Attorney, Agent, or Firm*—Trexler, Bushnell, Giangiorgi, Blackstone & Marr, Ltd.

(57) ABSTRACT

An emergency brake illumination system for a trailer illuminates the trailer brake lamps upon application of the emergency brakes. The system includes a pressure switch which senses pressure in the emergency brake system. The pressure switch is electrically connected between the blue circuit and the red circuit of a seven-way connector. If a loss of pressure is sensed by the pressure switch, the switch closes and power is provided by the blue circuit to the red circuit to illuminate the brake lamps.

22 Claims, 4 Drawing Sheets

TRAILER EMERGENCY BRAKE LAMP

RELATED APPLICATIONS

This application claims the priority of provisional application Serial No. 60/224,710 filed on Aug. 11, 2000 and entitled "Semi-trailer Emergency Brake Light".

BACKGROUND OF THE INVENTION

This invention is generally directed to an emergency brake lamp illumination system for a trailer. More particularly, the present invention contemplates a system which will illuminate the brake lamps on a tractor-trailer when the emergency brake is applied.

A standard tractor-trailer, uses two braking systems, a primary service brake and a secondary emergency/parking brake.

The primary service brake is a fully pneumatic system, using air pressure for signaling the application of the brakes. Federally required brake lamps on the trailer are used to indicate primary service brake application. The brake lamps are controlled by a pneumatic pressure switch mounted on the tractor and connected to the service brake control line. Thus, when the service brake is applied, a pneumatic pressure switch closes, completing the electrical circuit to the brake lamps mounted on the tractor and continuing through the electrical connection to the brake lamps on the trailer.

The secondary emergency/parking brake uses the loss of air to signal the application of a spring to apply the brakes. Thus, if air pressure in the braking system is lost, the emergency brake will automatically cause large springs on the brakes to apply the brakes to stop the trailer.

The problem with this braking system is that the brake lamps are not activated when the emergency brake is applied. Upon an emergency brake activation, the driver of the vehicle following the tractor-trailer does not have warning that the tractor-trailer is rapidly coming to a stop. It is obvious what can happen when a tractor-trailer stops rapidly without warning the driver behind.

The present invention provides an emergency brake lamp illumination system which overcomes the problems presented in the prior art and which provides additional advantages over the prior art, such advantages will become clear upon a reading of the attached specification in combination with a study of the drawings.

OBJECTS AND SUMMARY OF THE INVENTION

A general object of the present invention is to provide an emergency brake lamp illumination system for a trailer which will cause brake lamps on the trailer to illuminate when the emergency brakes are applied.

Another object of the present invention is to provide an emergency brake lamp illumination system which uses a pressure switch to sense pressure within the emergency braking system.

A specific object of the present invention is to provide an emergency brake lamp illumination system which uses a pressure switch to provide power to the brake lamps when the emergency brakes are applied.

Briefly, and in accordance with the foregoing, the present invention discloses an emergency brake lamp illumination system which senses pressure in the emergency braking system by using a normally-closed pneumatic-activated electrical switch. When power is supplied to the trailer, pressure will exist in the emergency braking system causing the pneumatic switch to open. If pressure is lost in the emergency braking system, this loss of pressure signals the application of a spring to apply the brakes. In addition, the loss of pressure causes the pressure switch to close and results in power being supplied to the brake lamps for illumination.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
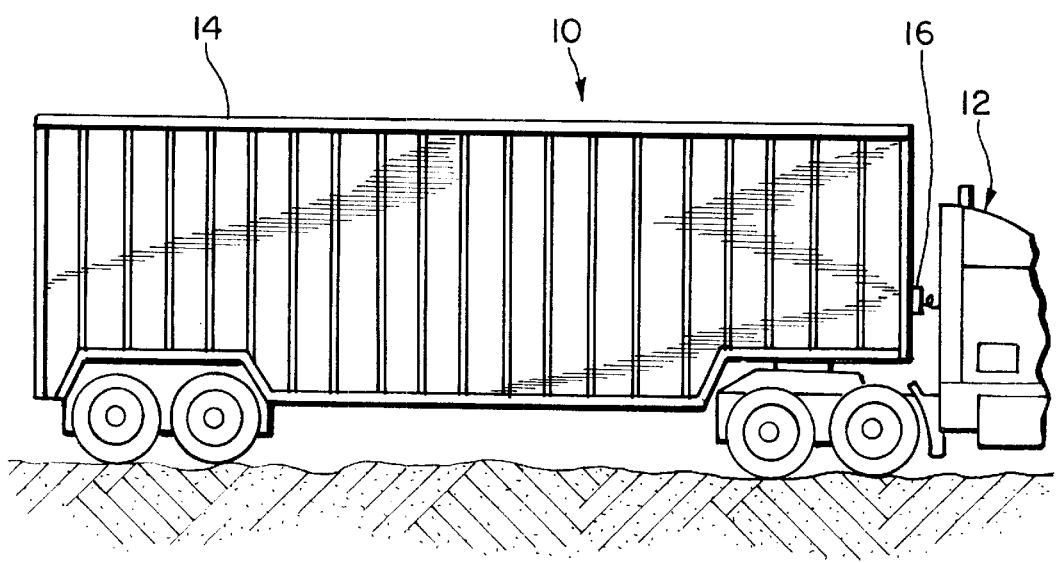
FIG. 1 is a side elevational view of a trailer and a partial side elevational view of a tractor on which the brake lamp illumination system of the present invention can be used.
Figure 2:
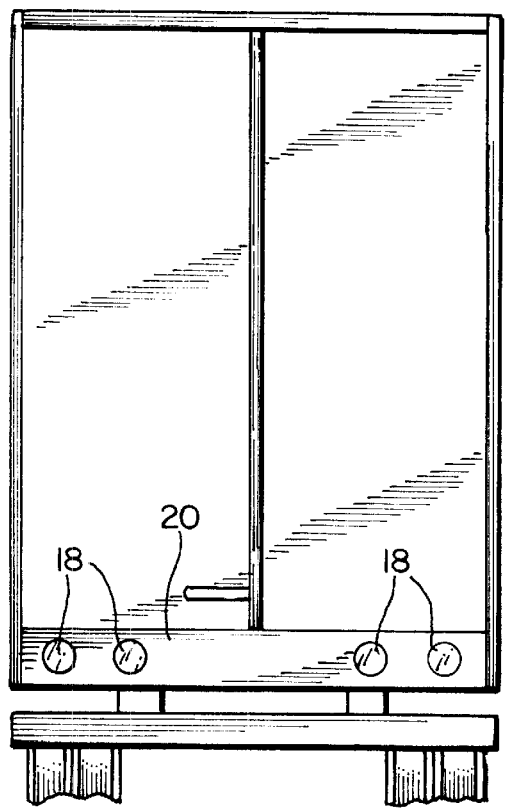
FIG. 2 is a rear elevational view of a trailer.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a brake lamp illumination system 8 which is used on a tractor-trailer 10 as shown in FIG. 1. An electrical connection is provided between the tractor 12 and the trailer 14 of the tractor-trailer 10 through a seven way connector 16. The brake lamp illumination system 8 operates to illuminate brake lamps 18 mounted on the sill 20 at the rear of a trailer 14.

The tractor-trailer 10 includes a primary service brake system and a secondary emergency brake system. When an operator applies pressure to the service brake pedal 22 on the tractor 12 air pressure signals the application of the brakes. When the service brake is applied, a pneumatic pressure switch 24 closes, completing the electrical circuit to the brake lamps mounted on the tractor and continuing through the electrical connection to the brake lamps 18 on the trailer 14.

Figure 3:
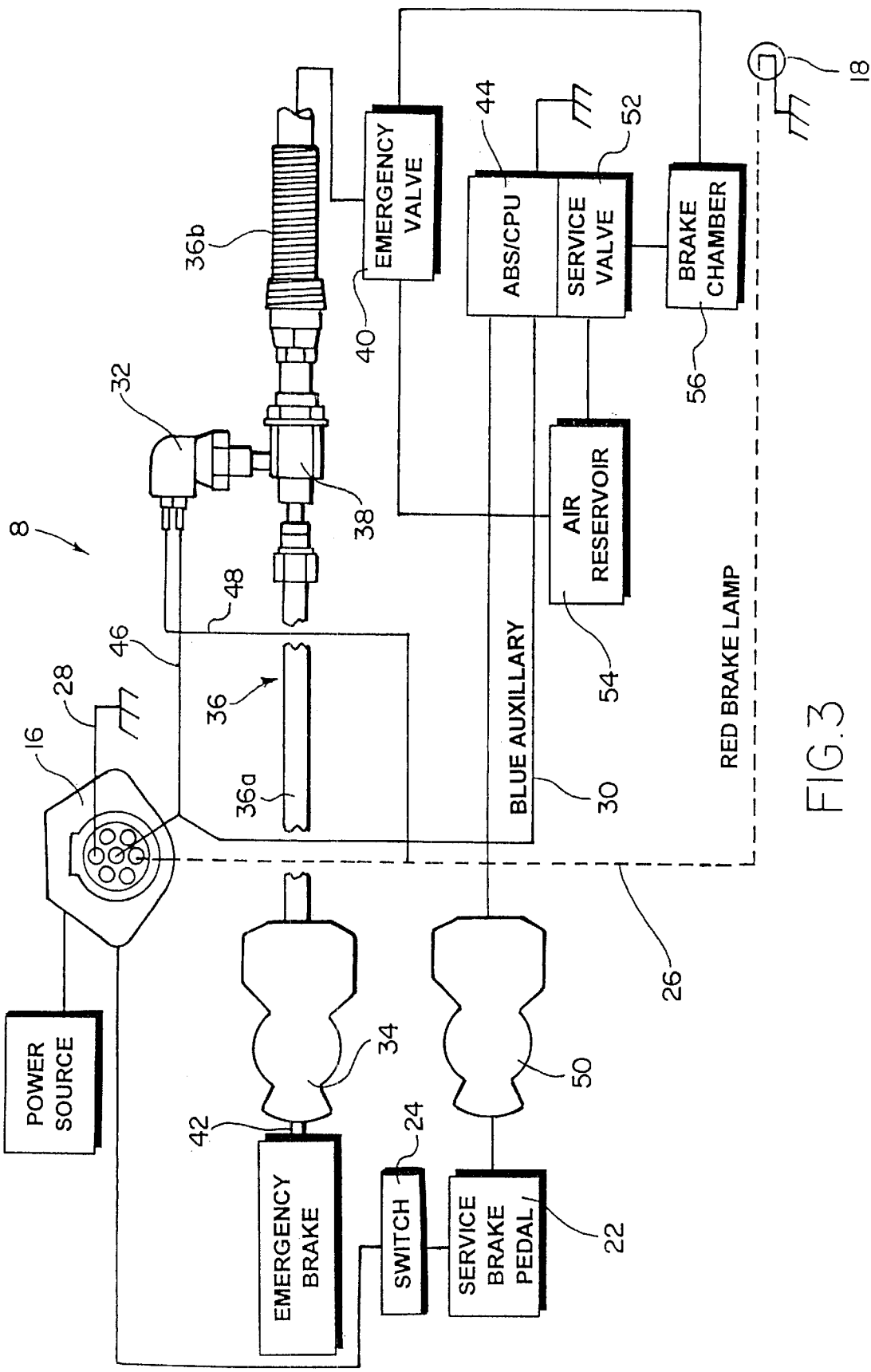
FIG. 3 is a diagram illustrating a first embodiment of the brake lamp illumination system of the present invention.

The seven-way connector 16 includes a wiring harness which has seven wires therein, which, as known in the art, are coded as the brown wire, the green wire, the red wire 26, the white (ground) wire 28, the black wire, the yellow wire and the blue (auxiliary) wire 30. Only three of the circuits for which the seven-way connector 16 provides connection are shown in FIG. 3.

The brake lamp illumination system 8 includes a pressure switch 32, a brake lamp 18, an emergency gladhand 34, an air line 36, an anchor tee 38, the red wire 26 of the seven way connector 16, the blue wire 30 of the seven way connector 16, and the white wire 28 of the seven way connector 16.

The pressure switch 32 is a normally-closed pneumatic-activated electrical switch which is activated by an emergency brake application as will be described herein. The pressure switch 32 is mounted on the trailer 14 and is used to supply power to the brake lamp 18 on the trailer 14. The pressure switch 32 is activated when the emergency brakes are applied for any one of a variety of conditions, such as, when a hose in the brake system ruptures, when the air chamber in the brake system ruptures, or any other condition which causes a loss of air pressure in the brake system and the resulting application of the emergency brakes.

The emergency gladhand 34 is used to couple an air line 42 from the tractor 12 to a first portion 36a of the air line 36 on the trailer 14. The anchor tee 38 connects the air line 36 to the pressure switch 32. The anchor tee 38 also connects the first portion 36a of the air line 36 to the second portion 36b of the air line 36. The second portion 36b of the air line 36 is connected to an emergency valve 40 which is connected to the brake chamber 56. The pressure switch 32 can be connected to the emergency braking system in other places than as shown. For example, the switch 32 could be placed between the emergency valve 40 and the brake chamber 56.

The red wire 26 is connected between the seven-way connector 16 and the brake lamp 18 on the trailer 14 such that the brake lamp 18 is illuminated when power is supplied to the red wire 26 upon depression of the brake pedal 22.

The blue wire 30 is connected between the seven-way connector 16 and the CPU of the anti-lock braking system (ABS) 44. Continuous power is provided to the CPU of the ABS 44 from the tractor 12 during operation by the blue wire 30.

The pressure switch 32 provides a connection between the blue wire 30 and the red wire 26 by a first wire 46 which is connected between the blue wire 30 and the pressure switch 20, and a second wire 48 which is connected between the pressure switch 32 and the red wire 26. Wires 46, 48 and the pressure switch 20 will activate the brake lamp 18 when the emergency brakes are applied as described herein.

When the trailer 14 is parked and is not connected to the tractor 12, the parking brake is engaged to cause the springs to apply the brakes. Because there is no connection between the tractor 12 and the trailer 14, there is no air in the braking system or power to the trailer 14 and therefore the brake lamps 18 are not illuminated.

After the primary gladhand 50 and the emergency gladhand 34 between the tractor 12 and trailer 14 are coupled, and when the parking brake of the tractor-trailer 10 is released, air flows through the brake system and causes the brakes to move away from the wheels by compressing the large springs. Because the pressure switch 32 senses pressure in the air line 36 of the emergency brakes, the pressure switch 32 opens. This prevents the transmission of power from the continuously-powered blue wire 30 to the un-powered red wire 26 via the connection through the first wire 46, the pressure switch 32 and the second wire 48.

When the service brakes of the tractor-trailer 10 are applied by the driver by depressing the service brake pedal 22, an air signal is communicated through the primary gladhand 50 to signal a service valve 52 to pull air from the air reservoir 54 and apply the service brakes. When the service brake pedal 22 is depressed, the switch 24 in the tractor signals power to be supplied through the seven-way connector 16 to the red wire 26 to illuminate the brake light 18. The air line 36 remains pressurized (and replenishes air to the air reservoir 54). Because the pressure switch 32 still senses pressure in the air line 36, the pressure switch 32 maintains its open state. Therefore, power is not supplied to the red wire 26 from the blue wire 30.

When the driver releases the service brake pedal 22, air is evacuated from the service brake system. This causes the brakes to move away from the wheels by releasing the air pressure in the brake chamber 56. As a result of the driver releasing the service brake pedal 22, power is no longer supplied to the red wire 26 via the seven-way connector 16. Additionally, because pressure remains in the air line 36, the pressure switch 32 remains open and prevents the transmission of power from the blue wire 30 to the red wire 26 via the connection through the first wire 46, the pressure switch 32 and the second wire 48.

When the tractor-trailer 10 is traveling along the road and an emergency situation arises, e.g. a hose ruptures or the air chamber leaks, such that a loss of air pressure in the emergency brake system results, the emergency brakes will be applied even though the driver does not depress the service brake pedal 22 in the tractor 12. Because the pressure switch 32 does not sense pressure in the air line 36, the pressure switch 32 returns to its normally closed state. As a result of the pressure switch 32 closing, power is provided from the continuously powered blue wire 30 to the red wire 26 via the connection through the first wire 46, the closed pressure switch 32 and the second wire 48. As such, power is applied to the red wire 46 and the brake lamp 18 illuminates, thereby signally to the driver of the vehicle following the trailer 14 that the trailer 14 is stopping.

Figure 4:
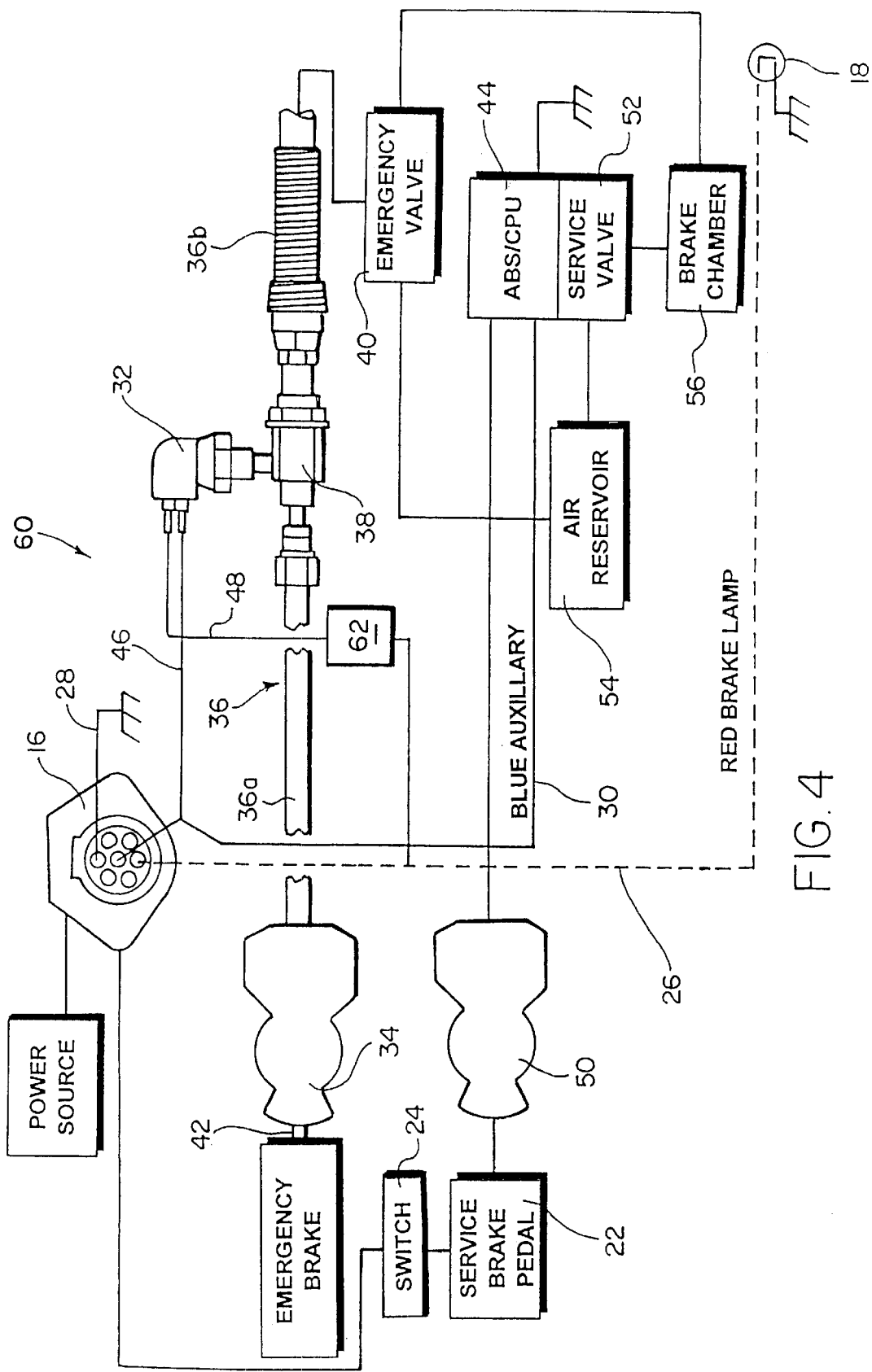
FIG. 4 is a diagram illustrating a second embodiment of the brake lamp illumination system of the present invention.

An emergency brake application is often activated without any warning. The nature of emergency brake application is an uncontrolled (modulated) application, and because it is a very aggressive brake that results in the tractor-trailer 10 stopping very rapidly, even when the brake light 18 is illuminated using the brake lamp illumination system 8 of the present invention, the driver of a following vehicle may not understand the manner in which the tractor-trailer 10 is stopping. In an emergency braking situation, the tractor-trailer 10 will come to a complete stop, rather than coming to a gradual stop or merely slowing down. A second embodiment of the present invention provides the driver following the tractor-trailer 10 with warning that the tractor-trailer 10 is not stopping in a conventional manner. The second embodiment of the brake lamp illumination system, shown in FIG. 4, is identical to the first embodiment of the brake lamp illumination system except for the differences described herein.

This second embodiment 60 of the brake lamp illumination system includes a conventional flasher circuit 62 electrically connected between the pressure switch 32 and the red wire 26.

In this second embodiment, when the pressure switch 32 is closed because of a loss of pressure in the air line 36, power is supplied from the blue line 30, to the first wire 46, through the pressure switch 32, through the second wire 48, through the flasher circuit 62, to the red line 26 and finally to the brake lamp 18. With the flasher circuit 62 connected to the second line 48, the brake lamp 18 is pulsed rapidly. The pulsing lamp 18 alerts the driver following the tractor-trailer 10 that the tractor-trailer 10 is not under normal braking action. This provides the driver of the following vehicle with a better warning of what is taking place in front of him or her. The flasher circuit 62 is used with LED (light emitting diode) brake lamps.

Often, a trailer 14 is attached to a tractor 12, and is backed up to a loading dock. When the parking brake is applied, air pressure is released from the emergency braking system and power is still being supplied to the trailer 14 from the tractor 12. As such, with the brake lamp illumination system 8 of the present invention, the brake lamp 18 will be lit. With the use of an incandescent bulb in the brake lamp 18, if the brake lamp 18 is lit for several minutes or hours against the loading dock seal, the high intensity light bulbs can cause significant heat to build up. This build up of heat can result in a fire hazard.

Figure 5:
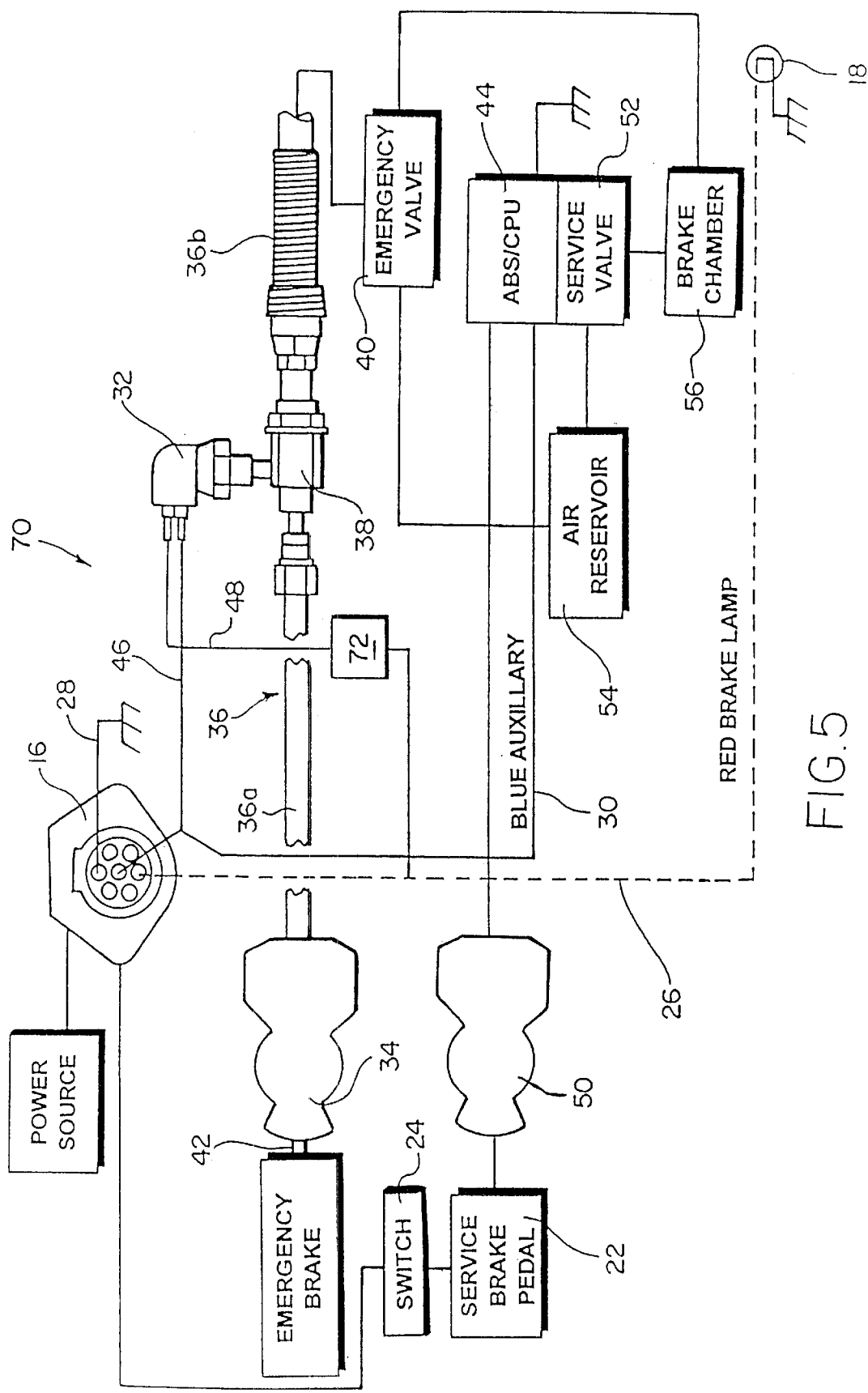
FIG. 5 is a diagram illustrating a third embodiment of the brake lamp illumination system of the present invention.

To overcome this problem, a third embodiment 70, shown in FIG. 5, of the present invention includes a timer 72. The components of the third embodiment 70 of the brake illumination system of the present invention are identical to the first embodiment 8 of the brake lamp illumination system except for the differences described herein. The timer circuit 72 is electrically connected between the pressure switch 32 and the red wire 26 using the second wire 48 and operates to cut off the power to the brake lamp 18 after a predetermined amount of time has elapsed. For example, a time limit of approximately two to four minutes will prevent over heating problems without interfering with the basic operation of the emergency brake lamp illumination system of the present invention.

The timer circuit 72 does not interfere with the lighting of the brake lamp 18 in an emergency situation because an emergency brake application takes place very quickly and the entire event, including stopping the entire tractor-trailer 10, takes approximately fifteen seconds.

While a preferred embodiment of the present invention is shown and described, it is envisioned that those skilled in the art may devise various modifications of the present invention without departing from the spirit and scope of the appended claims.

The invention claimed is:

1. An emergency brake lamp illumination system for a vehicle including:
    a source of power;
    a brake lamp;
    a first circuit connected to a service brake pedal and said brake lamp of the vehicle, wherein said first circuit supplies power to said brake lamp when the service brake pedal is depressed;
    a second circuit which continuously carries power from said power source when the vehicle is in use;
    an air line;
    a pressure switch which senses pressure in said air line; and
    wherein when said pressure switch senses a loss of pressure in said air line, upon activation of said emergency brake said pressure switch closes and power is supplied from said second circuit to said first circuit to illuminate said brake lamp.

2. An emergency brake lamp illumination system as defined in claim 1, further including a flasher circuit electrically connected to said pressure switch and said first circuit.

3. An emergency brake lamp illumination system as defined in claim 2, wherein said brake lamp includes an LED.

4. An emergency brake lamp illumination system as defined in claim 1, further including a timer circuit electrically connected to said pressure switch and said first circuit.

5. An emergency brake lamp illumination system as defined in claim 4, wherein said brake lamp includes an incandescent bulb.

6. An emergency brake lamp illumination system as defined in claim 1, wherein said second circuit is electrically connected to an anti-lock braking system.

7. An emergency brake lamp illumination system as defined in claim 1, wherein said first circuit is electrically connected to a seven-way connector.

8. An emergency brake lamp illumination system as defined in claim 1, wherein said second circuit is electrically connected to a seven-way connector.

9. A tractor-trailer comprising an emergency brake:
    a source of power provided on said tractor;
    a service brake pedal provided on said tractor;
    a brake lamp provided on said trailer;
    a first circuit connected to said service brake pedal and said brake lamp, wherein said first circuit supplies power to said brake lamp when said service brake pedal is depressed;
    a second circuit which continuously carries power from said power source when the tractor-trailer is in use;
    an air line;
    a pressure switch which senses pressure in said air line; and
    wherein when said pressure switch senses a loss of pressure in said air line, upon activation of said emergency brake said pressure switch closes and power is supplied from said second circuit to said first circuit to illuminate said brake lamp.

10. A tractor-trailer as defined in claim 9, further including a flasher circuit electrically connected to said pressure switch and said first circuit.

11. A tractor-trailer as defined in claim 10, wherein said brake lamp includes an LED.

12. A tractor-trailer as defined in claim 9, further including a timer circuit electrically connected to said pressure switch and said first circuit.

13. A tractor-trailer as defined in claim 12, wherein said brake lamp includes an incandescent light bulb.

14. A tractor-trailer as defined in claim 9, wherein said second circuit is electrically connected to an anti-lock braking system.

15. A tractor-trailer as defined in claim 9, wherein said first circuit is electrically connected to a seven-way connector.

16. A tractor-trailer as defined in claim 9, wherein said second circuit is electrically connected to a seven-way connector.

17. A method of illuminating a brake lamp on a trailer connected to a tractor, including the steps of:
    providing an emergency brake;
    providing a power source on said tractor;
    providing a service brake pedal on said tractor;
    providing a brake lamp on said trailer;
    providing a first circuit connected to said service brake pedal and said brake lamp, wherein said first circuit supplies power to said brake lamp when said service brake pedal is depressed;
    providing a second circuit electrically connected to said power source, wherein when said trailer and said tractor are in use, power is continuously supplied to said second circuit;
    providing an air line on said trailer;
    providing a pressure switch on said trailer for sensing the presence of pressure in said air line; and
    electrically connecting said first circuit to said second circuit by said pressure switch,
    wherein when said pressure switch senses a loss of pressure in said air line, upon activation of said emergency brake said pressure switch closes and power is supplied from said second circuit through said pressure switch, to said first circuit and said brake lamps are illuminated.

18. The method as defined in claim 17, further including the step of providing a flasher circuit between said pressure switch and said first circuit.

19. The method as defined in claim 17, further including the step of providing a timer circuit between said pressure switch and said first circuit.

20. A method of illuminating a brake lamp on a trailer connected to a tractor as defined in claim 17, further including the step of providing an anti-lock braking system electrically connected to said second circuit.

21. A method of illuminating a brake lamp on a trailer connected to a tractor as defined in claim 17, further including the step of providing a seven-way connector electrically connected to said first circuit.

22. A method of illuminating a brake lamp on a trailer connected to a tractor as defined in claim 17, further including the step of providing a seven-way connector electrically connected to said second circuit.

* * * * *